(12) United States Patent
Weiss et al.

(10) Patent No.: US 10,425,994 B2
(45) Date of Patent: Sep. 24, 2019

(54) GLASS CERAMIC COOKING PLATE WITH LOCALLY INCREASED TRANSMISSION AND METHOD FOR PRODUCING SUCH A GLASS CERAMIC COOKING PLATE

(71) Applicant: SCHOTT AG, Mainz (DE)

(72) Inventors: Evelin Weiss, Mainz (DE); Bernd Hoppe, Ingelheim (DE); Martin Spier, Mainz (DE); Daniela Seiler, Alzey (DE)

(73) Assignee: SCHOTT AG, Mainz (DE)

( * ) Notice: Subject to any disclaimer, the term of this patent is extended or adjusted under 35 U.S.C. 154(b) by 339 days.

(21) Appl. No.: 14/253,601

(22) Filed: Apr. 15, 2014

(65) Prior Publication Data

US 2014/0305929 A1 Oct. 16, 2014

(30) Foreign Application Priority Data

Apr. 15, 2013 (DE) .......................... 10 2013 103 776
Sep. 24, 2013 (DE) .......................... 10 2013 110 566

(51) Int. Cl.
*H05B 3/68* (2006.01)
*H05B 3/74* (2006.01)
(Continued)

(52) U.S. Cl.
CPC ............... *H05B 3/74* (2013.01); *B41M 5/262* (2013.01); *C03B 25/00* (2013.01); *C03C 4/0071* (2013.01);
(Continued)

(58) Field of Classification Search
CPC .... C03C 3/00; C03C 4/00; C03C 8/00; C03C 14/00; H05B 3/84–86; H05B 3/74–748; H05B 3/68–686
(Continued)

(56) References Cited

U.S. PATENT DOCUMENTS 4,211,820 A * 7/1980 Cantaloupe ......... C03C 10/0045
428/410
6,640,039 B1 10/2003 Miura et al.
(Continued)

FOREIGN PATENT DOCUMENTS

DE 19841547 3/2000
DE 19939787 A1 2/2001
(Continued)

OTHER PUBLICATIONS

French Office Action dated Jul. 28, 2014 corresponding to French Patent Application No. 14 53288 with English translation, 3 pages.
(Continued)

*Primary Examiner* — Michael A LaFlame, Jr.
(74) *Attorney, Agent, or Firm* — Ohlandt, Greeley, Ruggiero & Perle, L.L.P.

(57) ABSTRACT

A volume-colored monolithic glass ceramic cooking plate is provided. The plate includes a first zone in which the coloration of the glass ceramic differs from that of a second, adjacent zone, so that an absorption coefficient of the first zone is lower than the absorption coefficient of the second, adjacent zone and so that integral light transmission in the visible spectral range is greater in the first zone than the integral light transmission of the second, adjacent zone. The light scattering in the glass ceramic of the first zone differs from light scattering in the glass ceramic of the second zone by not more than 20 percentage points, preferably by not more than 5 percentage points.

22 Claims, 5 Drawing Sheets

(51) Int. Cl.

| | | |
|---|---|---|
| *C03C 23/00* | (2006.01) | |
| *B41M 5/26* | (2006.01) | |
| *C03C 4/00* | (2006.01) | |
| *C03C 4/02* | (2006.01) | |
| *C03C 4/08* | (2006.01) | |
| *C03C 4/10* | (2006.01) | |
| *C03C 10/00* | (2006.01) | |
| *F24C 15/10* | (2006.01) | |
| *H05B 6/12* | (2006.01) | |
| *C03B 25/00* | (2006.01) | |

(52) U.S. Cl.
CPC ............... *C03C 4/02* (2013.01); *C03C 4/082* (2013.01); *C03C 4/10* (2013.01); *C03C 10/0027* (2013.01); *C03C 23/001* (2013.01); *C03C 23/007* (2013.01); *C03C 23/0025* (2013.01); *F24C 15/10* (2013.01); *H05B 6/1218* (2013.01)

(58) Field of Classification Search
USPC ............... 219/443.1–468.2, 548; 501/14–19
See application file for complete search history.

(56) References Cited

U.S. PATENT DOCUMENTS

| | | | |
|---|---|---|---|
| 7,763,832 B2* | 7/2010 | Striegler | C03C 8/18 219/448.11 |
| 2004/0180773 A1 | 9/2004 | Schreder et al. | |
| 2005/0044895 A1 | 3/2005 | Yamate et al. | |
| 2009/0025426 A1 | 1/2009 | Landa et al. | |
| 2010/0273631 A1* | 10/2010 | Pelletier | C03C 3/085 501/26 |
| 2011/0226231 A1* | 9/2011 | Siebers | C03C 3/087 126/211 |
| 2012/0067865 A1* | 3/2012 | Siebers | C03C 10/0045 219/445.1 |
| 2013/0164509 A1 | 6/2013 | Siebers | |
| 2013/0224493 A1 | 8/2013 | Gabel | |
| 2016/0168018 A1 | 6/2016 | Gabel et al. | |

FOREIGN PATENT DOCUMENTS

| | | |
|---|---|---|
| DE | 10 2008 050 26 | 4/2010 |
| DE | 102008050263 A1 | 4/2010 |
| DE | 202011102663 | 12/2011 |
| DE | 102013216736 | 2/2015 |
| EP | 0233146 A1 | 8/1987 |
| JP | 2002348147 | 12/2002 |
| WO | 2010137000 A2 | 12/2010 |
| WO | 2012001300 A1 | 1/2012 |
| WO | 2012073153 A1 | 6/2012 |

OTHER PUBLICATIONS

European Search Report dated Oct. 29, 2014 corresponding to European Patent Application No. 14164628.1 with English translation, 17 pages.

German Office Action dated Jan. 9, 2014 corresponding to German Patent App. No. 10 2013 103 776.3 with English translation.

Li et al., "Spectroscopic Study of Optical Property and Structural State of Vanadium Ions in Lithium Aluminosilicate Glass-Ceramics", 2011, Spectroscopy Letters, 44:1, pp. 67-76.

Dejneka et al., "Chemically Strengthened Low Crystallinity Black Glass-Ceramics with High Liquidus Viscosities", 2014 International Journal of Applied Glass Science, 5 [2], pp. 146-160.

Samoilenko et al., "CW laser discoloration of X-ray irradiated silver doped silicate glasses", 2008, Elsevier, Science Direct, Optical Materials 30, pp. 1715-1722.

Veiko et al., "Generation of a bleaching wave in an ST-50-1 glass ceramics induced by a Nd:YAG laser", 2009, Quantum Electronics 39(1), pp. 59-62.

Veiko et al., "Laser modification of glass-ceramics structure and properties: a new view to traditional materials", SPIE, Bellingham, WA 2004, pp. 119-128.

Talkenberg et al., "Modifications and Color Markings in Glasses by UV Laser Radiation", Mater. Res. Soc. Symp. Proc. vol. 850 2005, pp. 143-147.

Leister et al., "Redox behaviour of iron and vanadium ions in silicate melts at temperatures up to 2000 ° C.[1]", Glastech. Ber. Glass Sci. Technol. vol. 72 1999, No. 5, pp. 153-160.

Talkenberg et al., "Reloading foreign ions when modifying glass by UV laser radiation for colour-marking and structuring", Dissertation, Jan. 14, 2005, with English abstract, 115 pages.

Chavoutier et al., "Effect of $TiO_2$ content ion the crystallization and the color of ($ZrO_2$,$TiO_2$)-doped $Li_2O$—$Al_2O_3$—$SiO_2$ glasses", Journal of Non-Crystalline Solids, No. 384, 2014, pp. 15-24.

Deubener, "10th International Symposium on Crystallization in Glasses and Liquids (Crystallization 2012)", Journal Non-Crystalline Solids, No. 384, 2014, p. 1.

* cited by examiner

GLASS CERAMIC COOKING PLATE WITH LOCALLY INCREASED TRANSMISSION AND METHOD FOR PRODUCING SUCH A GLASS CERAMIC COOKING PLATE

CROSS REFERENCE TO RELATED APPLICATIONS

This application claims benefit under 35 U.S.C. § 119(a) of German Patent Application No. 10 2013 103 776.3 filed 15 Apr. 2013 and claims benefit under 35 U.S.C. § 119(a) of German Patent Application No. 10 2013 110 566.1 filed 24 Sep. 2013, the entire contents of both of which are incorporated herein by reference.

BACKGROUND OF THE INVENTION

1. Field of the Invention

The invention relates to a glass ceramic cooking plate which exhibits increased transmission for visible light in a localized zone as compared to adjacent zones, and also relates to a method for modifying absorption properties of glass ceramic material in a localized area or full surface area over at least part of the thickness and/or volume of the starting material by a treatment with electromagnetic radiation, so that transmission of the monolithic starting material is altered in a desired extent. Specifically, the invention relates to glass ceramic cooking plates which can be produced by the method according to the invention.

2. Description of Related Art

For locally altering the transmission of glass ceramic components, four different possible ways have been known so far:

First, by joining two different materials with different transmission, a component can be created, which partially has a different transmission. Any joining process may be used for this purpose, such as brazing, welding and gluing. A drawback hereof is that in this case two different materials of different transmission are needed which have to be produced individually, and setting of a specific and different transmission is a challenge or is even not realizable at all in many cases. Moreover, the two different materials may have different mechanical, physical, and chemical properties. This might be disadvantageous in later use in terms of thermal shock resistance, chemical resistance, and mechanical fracture resistance. In addition, the joining seam has different physical and chemical properties and may have a detrimental effect on the properties of the component. In addition, the joining seam usually is visually disruptive or constitutes a starting edge for a fracture. Moreover, incorporation of closed surfaces into a huge component is often very difficult, since the joining has to be accomplished on all sides and gap sizes are difficult to be met, and it is impossible to apply forces on the joining seam to enhance adherence.

Second, transmission may be altered by a local coating. Such a solution is proposed in WO 2012/001300 A1, for example. Although only one material is required in this case, in contrast to a joining method, a coating material is additionally required, which has to meet specific required transmission characteristics. In order to obtain a locally higher transmission, those areas of the component which are to exhibit lower transmission are coated. A prerequisite is that the entire component must have a basic transmission that is as high as the highest transmission required in the finished product. In practice, this may lead to increased cost and complexity, since possibly the glass composition has to be changed.

Also, the cost and complexity of partial coating must not be underestimated, since masking has to be done in any way. Another drawback of the coating method is that a suitable coating has to be found, which sufficiently adheres on the component and survives any later operating conditions of the component without getting damaged.

Furthermore, the coating creates a new surface on the component, with different chemical and physical properties. In case of an outer coating of an article, scratches or other alterations and damage may occur. In addition, a coating always builds up on the surface, which is often undesirable in terms of haptics, appearance, scratch susceptibility, or friction.

Third, from EP 0233146 B1 a method is known for marking ceramic materials, glazes, glass ceramics and glasses by means of a laser. In this case, inorganic pigment particles in form of a "ceramic color body" are added as a radiation-sensitive additive to the material to be inscribed, which additive takes a different color as a result of the laser radiation. Since such pigment particles may only be added to glasses and glass ceramics during melting, they would also melt and would not have an effect any more. Such a method is only conceivable in ceramics which are sintered from powders. Also, a pulsed and focused laser beam which acts superficially is indispensable, since the ceramics are not transparent. In this process, the optimum wavelength to be selected for irradiation is that which is absorbed best by the radiation-sensitive additive, but the least possible by the inorganic material which is to be marked. Therefore, a prerequisite is a locally different absorption of the starting material, which means that local absorption points have to be included in the ceramics, which lead to a locally different absorption (and hence different color impression) of the starting material to be marked. Also, the depth of penetration of this markings is usually not greater than about 1 mm, since ceramics are usually opaque.

SUMMARY

The invention is based on the object to improve display capability of volume-colored glass ceramic cooking plates, in other words to provide the possibility for light from a display element arranged underneath a glass ceramic cooktop to pass through the glass ceramic, even if the glass ceramic is volume-colored to an extent that it appears to be dark colored for the viewer. Dark colored glass ceramic plates are usually used for cooking plates in order to visually hide the heating elements and other substructure of the hearth arranged underneath the cooktop. On the other hand it is desired to have display elements shining through the glass ceramic. These demands, though contradictory, are met by the invention in a surprisingly simple manner.

With the invention, addition of coloring bodies, e.g. in form of inorganic pigments, to the monolithic glass ceramic component can be dispensed with. No additional coating or joining is required to obtain a local modification in transmission.

Also, local scattering centers in the material which are produced by local destruction or alteration of the structure of the starting material should be eliminated.

Moreover, the use of an expensive, pulsed and highly focused laser whose focal point has to be driven precisely through the material and which only can treat a very small volume, is no longer necessary with the invention.

The drawbacks of a joining seam, namely its visual appearance and the presence of one or more additional component edges which may lead to breakage should be avoided with the invention.

Furthermore, it should be possible to easily modify the transmission of closed surfaces within a larger area without having to incorporate any other material for this purpose. In particular, manufacturing of several different starting materials of different transmission is eliminated.

In addition, coatings should no longer be required for locally modifying transmission, so that investigations for a suitable coating material and a suitable coating method are eliminated. On the other hand, however, coatings may optionally be used to adjust the transmission and/or color or to provide other properties, such as an anti-reflective coating.

Also, addition of any particulate additives that have to be suitable for the starting material and have to be chemically compatible therewith, is eliminated. Moreover, a heterogeneous color impression of the starting material caused by the admixed pigment can be avoided in this way.

Generally, glass ceramics colored in the visible wavelength range (380 nm-780 nm) are used for the invention. Typically, a result of such a coloration in the visible range is that a coloration also exists in the infrared range.

According to the invention, the modification in transmission is accomplished by a localized and temporary exposure to electromagnetic radiation, such as e.g. laser radiation of a diode laser of 1 μm wavelength, which radiation results in local heating of the material.

In order to achieve a local modification in transmission of the glass ceramic, the temperature of the glass ceramic is increased until an alteration of transmission occurs. Subsequently, cooling is effected, preferably very rapidly. The heating triggers appropriate physico-chemical reactions and/or increases electron and ion mobility in the starting material.

Accordingly, the invention provides a method for producing a glass ceramic cooking plate with locally modified transmission, in which a glass ceramic plate is provided which is volume-colored by coloring metal ions; and electromagnetic radiation is directed onto a localized surface area of the glass ceramic plate, which radiation is absorbed in the volume of the glass ceramic plate; and wherein the power density of the electromagnetic radiation is chosen such that the irradiated area of the glass ceramic plate is heated up, and heating is continued at least until the transmission of the glass ceramic material is increased in the volume of the heated zone, at least in a spectral range within the visible spectrum between 380 nanometers and 780 nanometers of light wavelength; and wherein after heating, irradiation of the electromagnetic radiation is stopped, and the irradiated area is cooled.

Typically, the temperature at which the increase in transmission occurs is above the temperature at which the glass ceramic has a viscosity of $10^{14}$ dPa·s. Preferably heating is not continued until the softening point at which the viscosity has a value of $10^{7.6}$ dPa·s, in order to avoid deformation.

In the context of the invention, a volume-colored glass or glass ceramic refers to a material in which the color centers or coloring ions are distributed throughout the material. That is to say they are not locally concentrated in form of coloring crystallites as is the case with pigments. Like a dye, the coloring ions or color centers are dissolved in the glass or glass ceramic, while pigments are dispersed in the material. Accordingly, volume-coloring has an effect on transmission, but not on scattering, whereas pigments themselves represent scattering particles. However, it is not intended to exclude that possibly additional pigments are present.

With this method, a volume-colored monolithic glass ceramic cooking plate is obtained, which comprises a first zone in which the coloration of the glass ceramic differs from that of a second, adjacent zone, so that the absorption coefficient of the first zone is lower than the absorption coefficient of a second, adjacent zone and so that integral light transmission in the visible spectral range is greater in the first zone than integral light transmission of the second, adjacent zone, while light scattering in the glass ceramic of the first zone differs from light scattering in the glass ceramic of the second zone by not more than 20 percentage points, preferably by not more than 10 percentage points, more preferably by not more than 5 percentage points, and most preferably by not more than 1 percentage points. Thus, light scattering in the glass ceramic of the first zone is substantially the same as light scattering in the second, adjacent zone of unchanged light transmission. The upper limit of light scattering differing by not more than 20 percentage points also applies to the case that light scattering in the first zone is lower than in the second zone. Given this marginal increase in light scattering, if any, there will be no visible effect. Light scattering is the fraction of total incident intensity minus the directly transmitted light, Fresnel reflection, and absorption. The difference in scattering given in percentage points refers to the proportion of scattered light during transmission of a light beam. If, for example, the proportion of scattered light intensity in the second zone is 3% of the total intensity, an increase by 5 percentage points in the first zone then means a proportion of scattered light intensity in the first zone of 3%+5%=8%. The terms transmission, scattering, absorption, and remission as used in the context of the invention are in conformity to the definitions according to DIN 5036-1 and can be determined with the measurement rules according to ISO 15368.

Integral light transmission refers to light transmittance averaged over a range of wavelengths, for example the visible spectral range from 380 to 780 nanometers wavelength. Transmittance is light transmission as a function of wavelength expressed as a percentage value. In the context of the present description, the term light transmission refers to integral light transmission, unless transmittance is mentioned. Of course, the absorption coefficient of the first zone does not have to be lower than the absorption coefficient of a second, adjacent zone over the entire spectral range of light including the infrared and ultraviolet range. Rather, the absorption coefficient of the first zone is decreased in average in the visible spectral range, so that integral light transmission in the visible spectral range is greater.

If only the surface of the material would be treated by the method according to the invention, the effect of modification of absorption and therefore modification of transmission would often be very small and usually inadequate when considering the whole volume. Therefore, the method of the invention permits, by selecting a wavelength of the radiation which is absorbed in the volume of the material, to not only heat and modify the surface, but simultaneously at least a certain region of the volume of the glass, in order to make the effect strong enough so that it will correspond to the extent desired for the application and to avoid overheating of the surface of the material during treatment.

As mentioned before, preferably a laser is used for locally heating the glass ceramic material. By using a laser beam, the radiation energy can be introduced into the material in strictly localized manner.

Another important feature of the invention is the fact that the incident wavelength need not be the wavelength at which the effect is achieved, i.e. the wavelength for which the modification of transmission occurs. It is possible according to the present invention to irradiate in the infrared wavelength range at a wavelength of 1 μm, for example, because there is an absorption band in this wavelength range in the glass or glass ceramics. But the resulting effect may occur in the visible range between 380 nm and 780 nm, for example, and a change of transmission may be caused at one or more wavelengths within this range due to physico-chemical reactions of the elements and compounds included in the glass. This is due to the fact that, although the irradiated energy only interacts with specific elements of the glass or the glass ceramic, it has an effect on the overall structure of the glass ceramic.

Thus, in order to achieve a local modification of transmission, an increase in temperature is also caused locally in the volume. This is effected by electromagnetic radiation in a wavelength range in which the glass ceramic exhibits partial transmittance for the incident electromagnetic radiation. In this way, energy is not only introduced superficially but throughout the entire thickness of the glass ceramic element or in a partial volume thereof. When the product of radiation density and absorption is sufficiently high, a (local) shock-like increase in temperature will occur, and thus an alteration of transmission. If this product is too large, only the surface will be heated and therefore overheated and the effect in the volume will not be strong enough without damaging the material. If the product is too small, heating will occur too slowly, and either the effect will not occur at all or it will not be localized, i.e. it will be smeared.

Therefore, according to one embodiment of the invention, the radiation density or power density of the electromagnetic radiation and/or the absorption coefficient α of the glass ceramic material is selected such that the product P of power density and absorption coefficient α is at least $P=0.25$ $(W/mm^3)\cdot(1/min)$. To avoid heating to occur only superficially, according to yet another embodiment of the invention, the absorption coefficient should be not more than $2/d$, wherein d is the thickness of the glass ceramic element.

The effect of a modification in absorption behavior and thereby a change in transmission is probably a result of redox reactions of coloring elements in the material, or of a dissolution of previously introduced color centers (e.g. by solarization effects or other extremely short-wave radiation energy). By choosing the radiation source and the manner of introducing the energy, the modification of transmission may range from a punctiform over a linear until to a 2-dimensional extent. Punctiform herein only refers to the geometric projection of the laser beam on the surface, but not to focusing in form of a spatial point. Across the thickness of the material the shape may therefore represent a cylinder or a cone with an acute angle. When introducing energy with a point-shape, the region of modified transmission may take any form, for example that of letters, characters, or that of triangles, squares, or any other geometric shape, by moving the radiation source or by moving the component. The dimensions of the zones of modified transmission may range from a diameter of 0.1 mm up to an area of several square meters. The magnitude of alteration in transmission may range from additional 0.1 percentage points to additional 50 percentage points in addition to the initial transmission. Preferably, in particular in dark colored glass ceramics, transmission in the visible spectrum of the first zone is increased by at least a factor of 2 as compared to the second, adjacent zone.

As already mentioned above, rapid cooling is preferred. This is favorable to rapidly reduce ion mobility after the heating and so to freeze the effect of color change and to prevent redox reactions that took place during heating from reversing. Therefore, according to one embodiment of the invention it is contemplated that the glass ceramic is cooled after heating, with a cooling rate of at least 1 K per second, preferably at least 5 K per second, more preferably at least 10 K per second, at least within a temperature range between the maximum temperature and 100 K below the maximum temperature.

According to one embodiment of the invention, the heating of the glass ceramic by the electromagnetic radiation is performed in such a manner that the surface of the glass ceramic plate remains cooler than volume regions below the surface. Thus, the volume will reach the required process temperature earlier than the surfaces. The process may be completed before the surfaces start to soften/yield. In this way, the surfaces remain rigid and no permanent plastic deformation will arise, and no tensile stress, or of a lower magnitude.

One way to achieve this is to cool the surface of the glass ceramic plate already while being heated by the electromagnetic radiation. In particular this means a cooling which causes a greater heat transfer than would otherwise exist by heat losses due to heat radiation and heat conduction. Cooling may in particular be accomplished by placing the surface in communication with a heat removing fluid or a refrigerant fluid. Particularly preferred in this case is a fluid stream that flows over the surface. Cooling may be effected on one side of the glass ceramic plate or on both sides. Suitable therefore is water or a water-ethanol mixture. Such a mixture absorbs less infrared radiation than water.

With such a cooling during heating, surface distortions or a volume expansion may possibly be avoided or at least reduced. According to yet another embodiment of the invention, compressive stress zones may be produced near the surface, or a formation of rather high tensile stresses is prevented, since expansion at the surface is reduced or avoided.

According to yet another embodiment of the invention, a step of thermal post treatment may be provided after cooling. With such a post treatment step, tensile stresses induced by the previous heating may be relieved. Also, fine-tuning of the produced transmission is possible by a step of thermal post treatment.

Possible variations of thermal post treatment include: (1) a second heating step using electromagnetic radiation, preferably using a laser, which heats the volume up to a stress relieving temperature and holds it there; (2) a second heating step using electromagnetic radiation, preferably using a laser, which only heats the surface(s) to relieve stress there. This may be beneficial because near-surface stresses are much more critical than stresses in the volume. To achieve such a rather superficial heating, electromagnetic radiation of wavelengths different from those of the electromagnetic radiation of the first heating step may be used for the second heating step; and (3) Thermal reheating and stress relieve in a conventional furnace, for example in a lehr.

Radiation sources that may be used include UV radiation sources, IR radiators with tungsten filament, laser sources, such as diode lasers, fiber lasers, and other radiation sources. The choice of the appropriate radiation source is determined by the absorption capacity of the glass to be treated in the range of wavelengths of the radiation source. For ceramized CERAN glass ceramics, for example, diode lasers of a wavelength in a range of about 1 μm are suitable. At this wavelength, transmittance of a CERAN plate of 4 mm thickness is between 50% and 80%, so that sufficient radiation passes through the entire thickness of the plate in order to heat it homogeneously throughout the thickness of the plate at the location of energy input. With sufficient power, therefore, a temperature of more than 700° C. may be obtained within a few seconds at the location of energy input.

Generally it is preferred to heat the glass ceramic with a rate of temperature change of at least 250 K per minute. The rapid heating ensures that the zones of altered coloration can be sharply defined or will have sharp contours. Moreover, undesired nucleation, or in case of glasses crystallization, is suppressed.

If it is assumed that the effect of modification of the absorption coefficient or the color change is solely a result of the temperature increase in the glass ceramic material, other types of energy input apart from radiation heating would in principle also be possible to achieve a color change, for example local heating using a gas burner. However, the rapid heating according to the invention using an electromagnetic radiation that penetrates into the material is preferred in order to achieve rapid heating of the volume below the irradiated surface. This allows to achieve sharp contours of the zones of modified coloration. With a merely superficial irradiation, the heat spreads laterally along the surface substantially just as quickly as in the direction away from the surface into the volume. Therefore, if a color change of the volume below the surface or in particular even of the entire region between two faces of a glass ceramic plate is produced only with superficial heating, blurred edges of the color-modified zone will result accordingly.

Once the plate has been cooled to room temperature, the transmission at the location of energy input will be higher than before the radiation treatment. The area of energy input may be determined both by the shape of irradiated energy, and by additionally masking of the plate to be treated, so that portions of the glass that are not intended to be modified are effectively protected from impingement of radiation.

An advantage of this method over the prior art is the fact that a monolithic component can be used, and that adaptations of the composition, joining or coatings are not required. The method can be carried out very rapidly (within seconds), is highly flexible and extremely well adaptable to a wide range of geometries and applications. And even three-dimensionally shaped parts can be treated.

The method of the invention is very suitable for locally attenuating the coloration of a glass ceramic article that is volume-colored by vanadium oxide. Accordingly in this case, by the heating, transmission in the visible spectral range between 380 nanometers and 780 nanometers is raised in the local area. Therefore, according to a preferred embodiment of the invention, a glass ceramic element volume-colored by vanadium oxide is provided, in which in the first zone treated according to the invention integral light transmission in the visible spectral range is increased relative to an adjacent second, non-treated zone.

In this way, windows of higher transmission may easily be produced in an otherwise dark appearing glass ceramic cooktop, for example. Underneath such a window, a display may then be mounted, the light of which will be clearly visible for the viewer. A window, as a particularly preferred form of a brightened area produced by the method according to the invention, refers to a zone which is surrounded along at least three edges thereof or at least along 50% of its periphery by adjacent non-brightened second zones. Preferably, the first zone is completely surrounded by second zones or non-brightened glass ceramic material.

Furthermore, it will generally be reasonable not to brighten the major part of the surface of the glass ceramic cooking plate, because in this case it would be easier to provide an appropriately lighter glass ceramic and then to make it darker in a localized area, for example by coating. According to one embodiment of the invention it is therefore intended that the proportion of the total surface area of the one or more first zones on one face of the glass ceramic cooking plate occupies not more than one third of the surface area of this face. If there are more than one brightened area, the invention preferably contemplates in accordance with this embodiment that the total surface area of all of these areas occupies not more than one third of the surface area of one face of the glass ceramic cooking plate.

BRIEF DESCRIPTION OF THE DRAWINGS

The invention will now be described in more detail by way of exemplary embodiments and with reference to the accompanying figures. In the figures, the same reference numerals designate the same or equivalent elements.

In the drawings.

DETAILED DESCRIPTION

Figure 1:
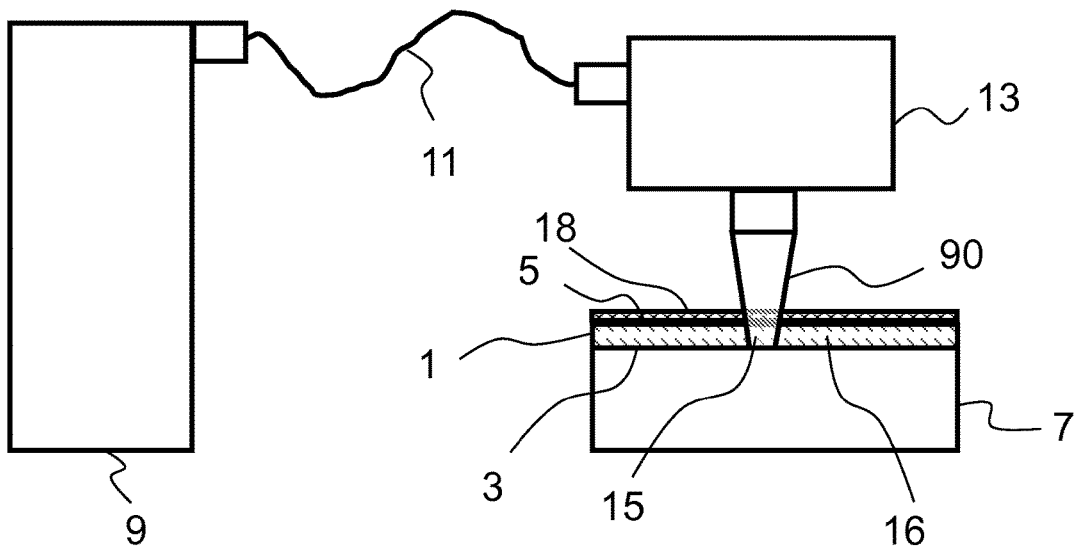
FIG. 1 shows an apparatus for performing the method of the invention.

The method of the invention for producing a glass ceramic cooking plate with locally modified transmission will now be described in more detail with reference to FIG. 1. A glass ceramic cooking plate 1 is provided in form of a glass ceramic plate 1 which has a first face 3 and a second face 5 and dimensions of 50 mm×50 mm and a thickness of 4 mm. The glass ceramic cooking plate 1 may have a knob pattern on one face, as usual. In particular, the glass ceramic cooking plate is volume-colored by coloring metal ions. Such metal ions may for example be manganese ions, iron, rare earth ions, in particular cerium ions, chromium, nickel, cobalt or vanadium ions. The coloring effect of these ions may depend on an interaction with other components of the glass ceramic. That means, the coloration may be enhanced by interaction with other metal ions, or vice versa, may be attenuated. For example, manganese and iron ions exhibit interaction with tin and/or titanium, which is why preferably manganese or iron oxide is employed as a coloring agent preferably in combination with tin oxide and/or titanium oxide in the composition. Coloring ions of rare earths, in particular cerium ions, interact with ions of chromium, nickel and cobalt. Preferably, therefore, rare earth oxides are employed as a coloring agent in combination with oxides of the above mentioned metals in the glass ceramic composition. For vanadium, an interaction with tin, antimony, or titanium can be assumed.

Generally, without being limited to the specific exemplary embodiments, the glass ceramic includes ions of at least one of the following metals, or combinations of ions of the following metals:

vanadium, in particular in combination with tin and/or titanium;

rare earths, in particular cerium, preferably in combination with chromium and/or nickel and/or cobalt;

manganese, preferably in combination with tin and/or titanium;

iron, preferably in combination with tin and/or titanium.

Vanadium oxide is a very strong coloring agent. Generally in this case, coloration is only accomplished during ceramizing. It has been found that with the invention a volume-coloration by vanadium oxide may be reversed, at least partially. To obtain a clearly visible effect in case of a glass ceramic colored by vanadium oxide, it is therefore contemplated according to one embodiment of the invention, without limitation to the exemplary embodiments, that the glass ceramic includes at least 0.005, preferably at least 0.01 percent by weight of vanadium oxide. This causes a sufficiently strong coloration and accordingly a significant change of transmission in local brightened zone 15.

Glass ceramic cooking plate 1 is placed on a slip-cast silicon oxide ceramic support 7 of 100 mm×100 mm and of a thickness of 30 mm. The first face 3 bearing upon the silicon oxide ceramic support 7 is for example the smooth upper surface of glass ceramic cooking plate 1. The upwardly facing second face 5 is the knobbed bottom face in this case. Generally, like in this example, it may be beneficial to irradiate the electromagnetic radiation to that surface which later faces away from the user. In a glass ceramic cooktop, one face of the glass ceramic plate typically has a knob pattern thereon and defines the surface facing away from the user, or the lower surface of the cooktop. Irradiation is suitably effected on the surface facing away from the user because the surface that faces the radiation source tends to become warmer, which may lead to surface alterations. Such alterations will be less disturbing on the typically knobbed surface that faces away from the user.

Silicon oxide ceramic support 7 and glass ceramic cooking plate 1 are at room temperature. Above this arrangement, a laser scanner 13 with a focusing optical system of 250 mm focal length is installed in a manner so that laser beam 90 is incident perpendicular to the surface of glass ceramic cooking plate 1. In the focus, laser beam 90 has a diameter of 1.5 mm. The arrangement of silicon oxide ceramic support 7 and glass ceramic cooking plate 1 is placed at such a distance that the glass ceramic cooking plate 1 is not in the focus of laser beam 90, so that the laser beam is defocused. In the exemplary embodiment, laser beam 90 has a diameter of 10 mm on glass ceramic cooking plate 1. Laser radiation of a wavelength between 900 nm and 1100 nm is supplied from a laser 9 to laser scanner 13 via a transfer fiber 11. In this example, a diode laser is used as the laser 9, e.g. from company Laserline, which provides an adjustable output power between 0 W and 3000 W. Once the laser 9 has been enabled, glass ceramic plate 1 is locally irradiated with an output power of 1000 W and for a duration of 10 seconds. The glass ceramic is thereby heated at a rate of more than 250 K per minute, and within the period of irradiation the temperature at which the glass ceramic has a viscosity of $10^{14}$ dPa·s is exceeded. Then, the laser is turned off and the glass ceramic plate cools down in air. The cooling rate achieved in this way is more than 1 K per second, usually even more than 5 K per second, or more than 10 K per second, at least within a temperature range between the maximum temperature and 100 K below the maximum temperature, preferably down to the temperature at which the viscosity of the glass ceramic has a value of $10^{14}$ dPa·s. In this manner, the color change, especially the brightening effect in this case, is frozen. In local zone 15 which was heated by laser beam 90, transmission has locally become significantly higher throughout the entire thickness of the plate, which means that visible radiation can better pass through the glass ceramic cooking plate 1. Neighboring zones 16 of the plate, or the rest of glass ceramic cooking plate 1, remain dark, i.e. keep its low transmission in the visible range. Also, glass ceramic cooking plate 1 is geometrically unchanged, in particular even in irradiated zone 15. This applies to both, flatness and local thickness variations.

According to another embodiment, the laser beam may be scanned over the surface of the glass ceramic cooking plate by means of a laser scanner, so that a zone 15 is heated, which has a larger surface than the light spot of the laser beam on the surface of the glass ceramic cooking plate.

The first zone 15 of higher transmission than that of adjacent zones 16 extends from a first face to a second, opposite face of the glass ceramic cooking plate, or from the upper surface to the lower surface thereof. This is achieved by the electromagnetic radiation which penetrates through the glass ceramic cooking plate and thus heats the entire glass ceramic material between the two opposite faces.

However, it is also possible to achieve an increase in transmission to improve the visibility of indications when not the entire volume between the two surfaces is brightened, but only a layer, for example of a layer thickness that corresponds to half the thickness of the glass ceramic plate. Generally, of course, it is possible with the method of the invention to produce a plurality of zones 15 in the glass ceramic cooktop.

In a modification of the invention, glass ceramic plate 1 is optionally cooled superficially during irradiation, i.e. when being heated up. For this purpose, a cooling fluid 18 is brought into contact with the surface of glass ceramic plate 1. Cooling fluid 18 may flow over the surface of glass ceramic plate 1 to enhance the cooling effect. Specifically, in the exemplary embodiment shown in FIG. 1, a film of cooling fluid 18 is provided on the irradiated second face 5 of glass ceramic plate 1. It could easily be caused to flow along the surface or along second face 5 by having the face 5 arranged obliquely, for example, and/or by continuously feeding cooling fluid 18. Otherwise than shown in FIG. 1, an arrangement may be provided in which both faces 3, 5 are in contact with a cooling fluid 18, preferably a flowing cooling fluid 18.

Suitable is an ethanol-water mixture. Generally, without being limited to the illustrated exemplary embodiment, it is preferred in this case that the ethanol content of the mixture does not exceed 50 percent by volume. Such a mixture is advantageous, because it absorbs less infrared radiation than pure water. With the cooling fluid, alterations of the surface such as warping or bulging can be avoided or at least reduced. Additionally, the properties of the glass ceramic plate 1 may be positively influenced by the simultaneous cooling during irradiation. According to yet another embodiment of the invention, compressive stress may be produced at the surface. At least it is possible to prevent or reduce high tensile stresses at the surface after irradiation and cooling.

Generally, therefore, a glass ceramic plate 1 may be produced, in which in the first zone 15 treated according to the invention superficial stress is lower than in the center of the volume of the first zone 15. Here, the term lower stress is not to be understood as an absolute value, but with sign. For example, the surface may almost be free of stress, while in the center of the volume there is a tensile stress which is a stress with a positive sign. Even in this case, the stress is lower at the surface, since the interior stress is positive.

According to one embodiment of the invention it is generally favorable for the method, without being limited to the particular exemplary embodiment of FIG. 1, when a means is provided which reflects the electromagnetic radiation transmitted through the glass ceramic plate 1 back into the glass ceramic plate 1. In particular, for this purpose, the glass ceramic plate may be placed on a support which reflects electromagnetic radiation back into the glass ceramic plate 1.

By such reflection, the efficiency and speed of the heating may be increased and so the process duration may be shortened. If an infrared laser is used, like in the example of FIG. 1, a support may be used, which specifically reflects in the range of wavelengths of the laser radiation from 0.9 µm to 1.1 µm.

If, as in the example shown in FIG. 1, a slip-cast silicon oxide ceramic support 7 is employed, an appropriately fine-grained silicon oxide ceramic may be used for this purpose. Generally, without limitation to silicon oxide ceramics, it is preferred according to a further embodiment of the invention that the average grain size of a ceramic, preferably of the slip-cast $SiO_2$ ceramic that is used as a support for glass ceramic plate 1, is smaller than the wavelength of the electromagnetic radiation. In this manner strong scattering of the radiation at the surface of support 7 is avoided. In case of broadband radiation sources, the average grain size of the ceramic should be less than the wavelength of the maximum spectral power density of the radiation transmitted through glass ceramic plate 1, or alternatively the center wavelength of the spectrum of the radiation transmitted through glass ceramic plate 1.

According to another embodiment of the invention, instead of a ceramic surface such as that of the silicon oxide ceramic support 7 used in the embodiment shown in FIG. 1, a metallic reflecting support can be used. Suitable are aluminum or polished copper, for example. It is of course also possible to combine this embodiment with a ceramic support, by placing a metallic reflective layer or plate on ceramic support 7.

The heating and resulting color change of zone 15 and subsequent cooling may optionally be followed by a thermal post treatment step to relieve tensile stresses. Thermal post treatment at a temperature of 800° C. and a holding time of 5 minutes already leads to a significant reduction of tensile stresses in a glass ceramic plate 1. The heating to a relaxation temperature in the thermal post treatment step may be accomplished using a laser, any other electromagnetic radiation source, or in a suitable furnace. When heating is effected using electromagnetic radiation, a radiation source may be used whose radiation is more strongly absorbed than the electromagnetic radiation used for heating in the first step for brightening. So in particular the surface of the glass or glass ceramic will be heated. Tensile stresses existing at the surface are particularly relevant with regard to the strength of the glass ceramic plate 1.

In the example shown in FIG. 1, an optional cooling fluid is provided to prevent excessive heating of the surface. Another measure to produce a temperature gradient such that during irradiation the surface remains cooler than zones of the glass ceramic below the surface would be an appropriate initial temperature profile of the glass ceramic plate to be treated. For example, initial starting temperature profiles with a suitable gradient over the thickness of the glass ceramic may be produced by freezing and/or pre-heating. For an appropriate starting profile, the volume may in particular be made hotter than the surface already prior to the actual exposure to the electromagnetic radiation. To give an example, the glass ceramic plate 1 may be pre-heated with quenching of the surface prior to being exposed to electromagnetic radiation.

According to yet another embodiment of the invention, otherwise than shown in FIG. 1, laser beam 90 may be focused in the volume of the glass ceramic. In this way, compressive stresses may possibly arise at the surfaces of the processed material.

Generally, the ceramic material may additionally be toughened prior to or after the color change. This may be accomplished by thermal or chemical tempering for selectively introducing near-surface compressive stress zones, so that the material resists to or compensates for tensile stresses possibly induced by the process.

Figure 2:
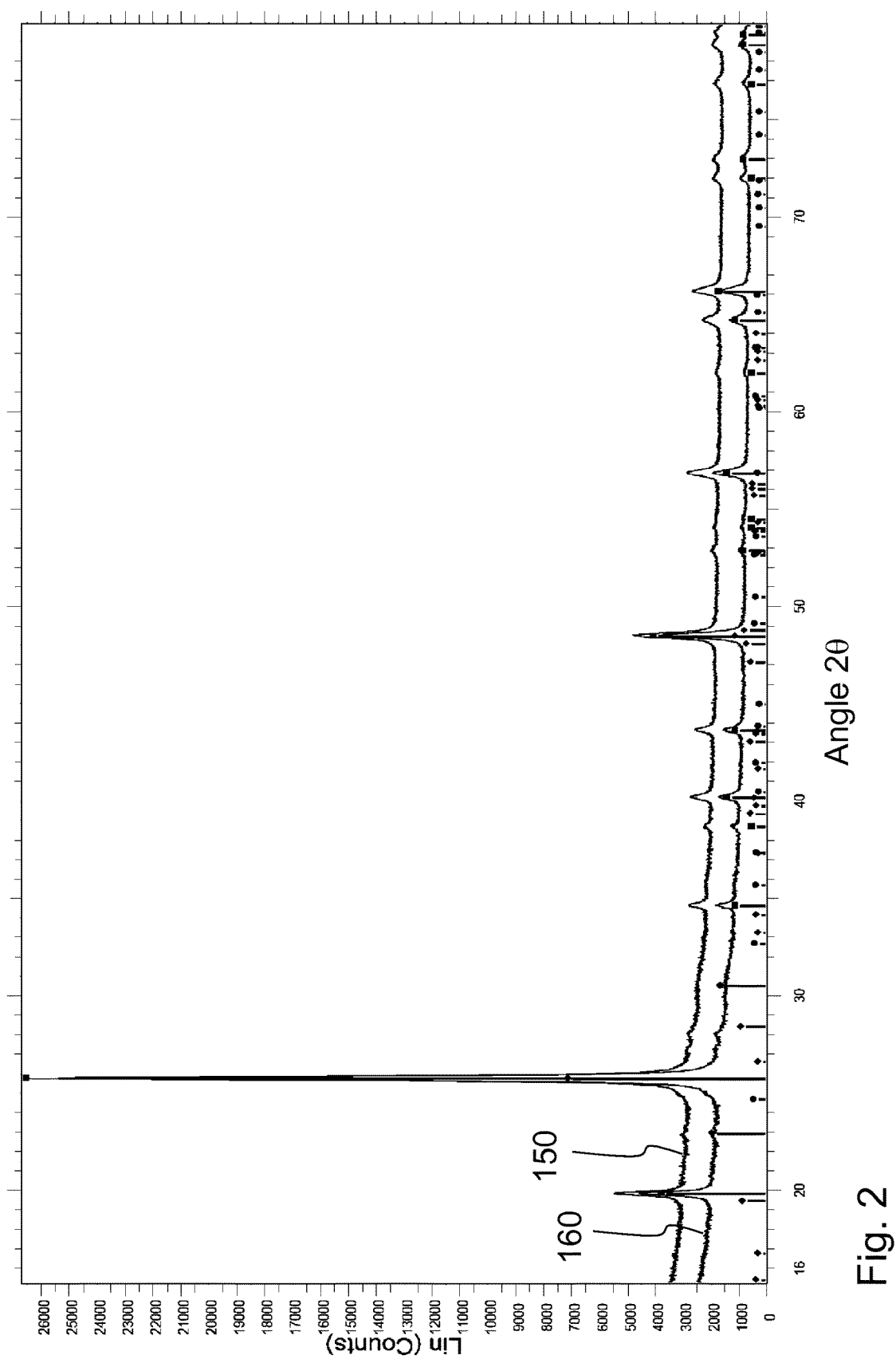
FIG. 2 are X-ray diffraction spectra of a brightened zone and an unchanged zone of a volume-colored glass ceramic.

FIG. 2 shows X-ray diffraction spectra of a monolithic glass ceramic element as obtained by the method explained with reference to FIG. 1. The tested glass ceramic is a lithium aluminosilicate glass ceramic volume-colored by vanadium oxide, as is used for cooking plates. X-ray diffraction was used to compare the crystal phases, the content of crystal phases, and the crystallite size of a zone 15 brightened by laser irradiation with those of adjacent, non-brightened zones 16.

Additionally marked with a diamond, a square, or a circle are the relative intensities of different crystal phases. Squares indicate X-ray diffraction peaks of high-quartz mixed crystal (HQMK), diamonds indicate X-ray diffraction peaks of lithium aluminosilicate or keatite mixed crystal (KMK, $LiAlSi_3O_8$), and circles indicate X-ray diffraction peaks of zirconium titanate ($ZrTiO_4$) which was also detected in the glass ceramic. Curve 150 is the X-ray diffraction spectrum of the brightened zone, i.e. zone 15 treated according to the invention, and curve 160 is the X-ray diffraction spectrum of an adjacent, unchanged zone 16. As can be seen, the curves are virtually identical, except for the different offset for purposes of illustration. The only result of a closer analysis of the intensities of the X-ray diffraction peaks is a very small increase in the content of the keatite mixed crystal phase. The results are summarized in the table below:

| Sample | Crystallite size [nm] [+/−5%] | | HQMK phase content [+/−10%] | | KMK phase content [+/−10%] | |
|---|---|---|---|---|---|---|
| | HQMK | KMK | uncorrected | corrected | uncorrected | corrected |
| brightened zone | 49 | not determinable | 54 | 66 | 3 | 3 |

-continued

| Sample | Crystallite size [nm] [+/−5%] | | HQMK phase content [+/−10%] | | KMK phase content [+/−10%] | |
|---|---|---|---|---|---|---|
| | HQMK | KMK | uncorrected | corrected | uncorrected | corrected |
| unchanged zone | 48 | not determinable | 55 | 67 | 1 | 1 |

For absorption correction in the columns designated "corrected", the chemical composition of the glass ceramic and an assumed density of $\rho=2.5$ g/cm$^3$ were used.

According to the table above and to FIG. 2, the content of the high-quartz mixed crystal phase does not change within the measurement error. Only the content of keatite mixed crystal shows a change which does not have any significant impact on the microstructure of the glass ceramic because of the low proportion of this crystal phase. That means, even if treated and non-treated zones of a glass ceramic element do not exhibit any significant structural differences, according to one embodiment a zone of an aluminosilicate glass ceramic treated according to the invention, in particular of a lithium aluminosilicate glass ceramic, may be distinguished by a higher content of keatite mixed crystal as compared to an adjacent, non-treated zone.

Changes in the crystal phases and/or their proportions may have an influence on light scattering. When light scattering in the material changes, this also leads to a change in remission when illuminating the treated zone. As demonstrated in the above example, treated and non-treated zones are virtually identical in their morphology, in particular with respect to the existing crystal phases. Therefore, in an inventive product remission does not change either, or only marginally, when comparing a treated and a non-treated zone. Therefore, according to a further embodiment, without limitation to the exemplary embodiment described above, remission for visible light in the first zone differs from remission of the second zone by not more than 20 percentage points, preferably by not more than 10 percentage points, more preferably by not more than 5 percentage points. Light scattering in the first zone likewise increases only marginally, if at all, by less than 5 percentage points.

Figure 3:
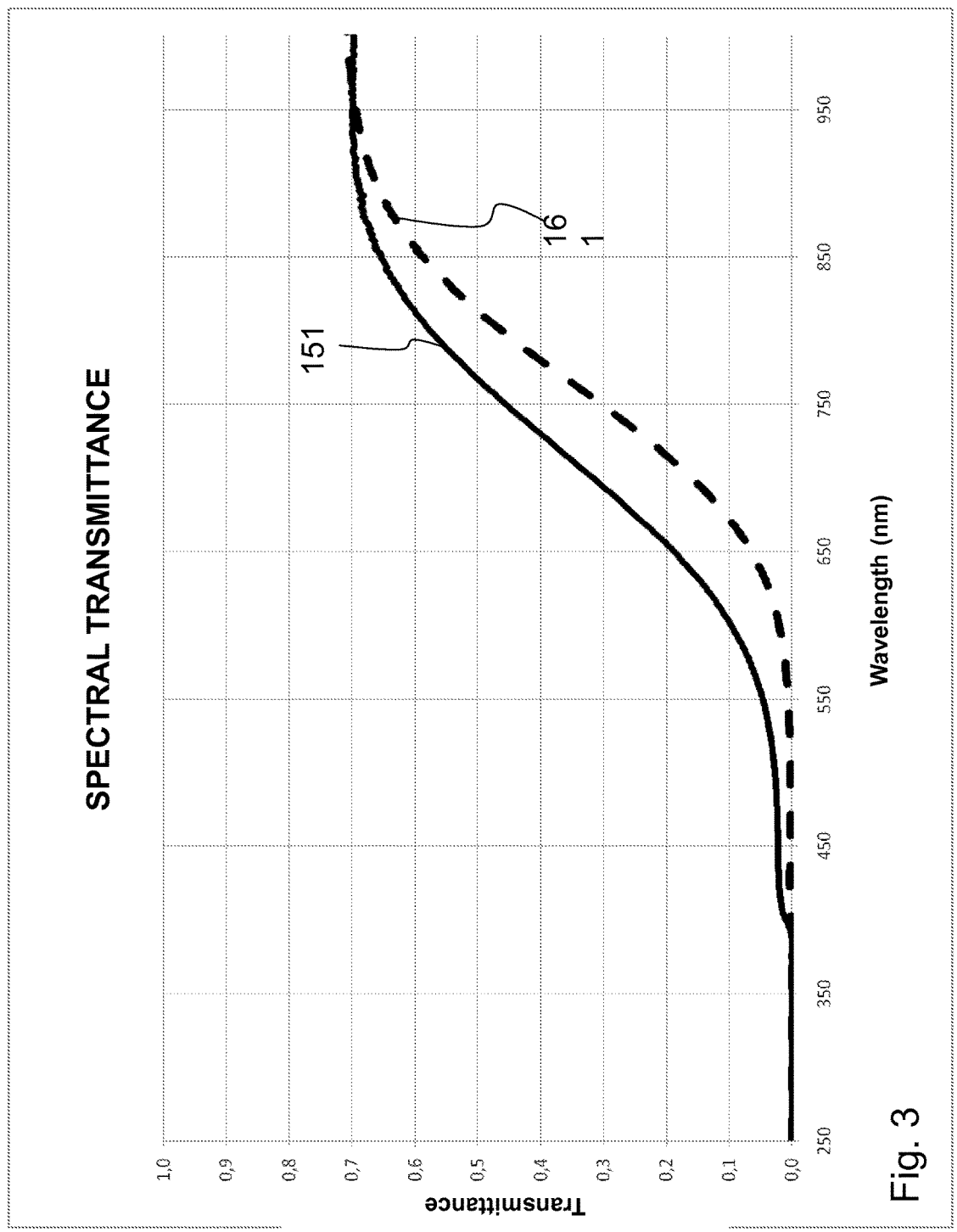
FIG. 3 is a graph of spectral transmittance of a treated zone and a non-treated zone of a glass ceramic cooking plate.

FIG. 3 shows transmittances of a glass ceramic plate volume-colored by vanadium oxide and treated according to the invention, as a function of wavelength. Curve 151 in FIG. 3 represents spectral transmittance of a zone 15 treated according to the invention, curve 161 represents spectral transmittance of an adjacent, non-treated zone 16. From the two curves it can be seen that in the treated zone 15 transmittance is significantly increased over the entire spectral range between 420 nanometers and 780 nanometers. This is advantageous when it is desired to improve transparency without significantly altering the tint, in order to selectively make specific zones of the glass ceramic cooktop more transparent for luminous or non-luminous display elements, or more generally, to introduce windows, in particular viewing windows. Therefore, according to one embodiment of the invention and without limitation to the specific exemplary embodiment, spectral transmittance of the first zone is higher than that of an adjacent, second zone within the entire spectral range between 420 nanometers and 780 nanometers.

What is also remarkable about the spectral transmittance of FIG. 3 is that transmittance in the blue and green spectral range increases more strongly than that in the red range. For example, at 500 nanometers transmittance increases from 0.0028 to 0.027, i.e. by a factor of more than nine. At 600 nanometers, the factor is lower, namely 4.7 in this case. It is just this what is particularly favorable to improve display capability for blue and/or green display elements or for color displays in volume-colored glass ceramics, especially those colored by vanadium oxide. Therefore, according to yet another embodiment of the invention, the ratio of spectral transmittances of the first zone to the second zone is greater at a wavelength in a range from 400 to 500 nanometers than at a wavelength in a range from 600 to 800 nanometers.

Below, the colors are listed as measured in the treated and non-treated zones 15, 16 in transillumination of the glass ceramic plate of 4 mm thickness, for different color models (xyY, Lab, Luv) and various standard light sources:

| | Standard light type A | |
|---|---|---|
| | zone 16 | zone 15 |
| x | 0.6307 | 0.5782 |
| y | 0.3480 | 0.3805 |
| Y | 1.7 | 7.6 |

| | Standard light type D65 | |
|---|---|---|
| | zone 16 | zone 15 |
| X | 0.5550 | 0.4773 |
| Y | 0.3540 | 0.3752 |
| Y | 1.2 | 6.2 |
| Ra | −25.6 | 22.0 |

| | Standard light type C | |
|---|---|---|
| | zone 16 | zone 15 |
| X | 0.5545 | 0.4763 |
| Y | 0.3495 | 0.3685 |
| Y | 1.2 | 6.3 |
| Yellowness I. | 174.0 | 120.8 |

| | Standard light type A | |
|---|---|---|
| | zone 16 | zone 15 |
| L* | 13.6 | 33.2 |
| a* | 23.2 | 24.2 |
| b* | 19.1 | 27.7 |
| C* | 30.0 | 36.8 |

| Standard light type D65 | | |
| --- | --- | --- |
|  | zone 16 | zone 15 |
| L* | 10.6 | 30.0 |
| a* | 20.8 | 20.2 |
| b* | 13.8 | 22.9 |
| C* | 25.0 | 30.5 |

| Standard light type C | | |
| --- | --- | --- |
|  | zone 16 | zone 15 |
| L* | 10.8 | 30.2 |
| a* | 20.1 | 19.2 |
| b* | 14.1 | 23.2 |
| C* | 24.5 | 30.1 |

| Standard light type A | | |
| --- | --- | --- |
|  | zone 16 | zone 15 |
| L* | 13.6 | 33.2 |
| u* | 30.3 | 45.3 |
| v* | 0.9 | 4.3 |

| Standard light type D65 | | |
| --- | --- | --- |
|  | zone 16 | zone 15 |
| L* | 10.6 | 30.0 |
| u* | 22.6 | 36.6 |
| v* | 7.0 | 18.5 |

| Standard light type C | | |
| --- | --- | --- |
|  | zone 16 | zone 15 |
| L* | 10.8 | 30.2 |
| u* | 22.9 | 36.7 |
| v* | 7.8 | 20.3 |

In the Lab, xyY, and Luv color models, parameters L and Y, respectively, denote the brightness. When using standard light type C or standard light type D65, the parameter Y in the xyY color model corresponds to transmission $\tau_{vis}$ in the visible spectral range, and from a comparison of the Y values the increase in transmission can be determined. From the values given above it can be seen that transmission in the visible spectral range is increased by at least a factor of 2.5. Generally, it should be noted here that the transmission additionally depends on the refractive index and on the thickness of the transilluminated glass ceramic cooking plate. However, it can be generally stated that according to one embodiment of the invention the transmittance in the visible spectral range between 380 and 780 nanometers is increased by at least a factor of 2.5, based on a thickness of 4 millimeters.

The coloring by vanadium oxide, $V_2O_5$, as existing in the exemplary embodiments of FIGS. 2 and 3 discussed above, has also been known from DE 10 2008 050 263 B4, according to which the coloring mechanism is a complex process. According to this document, a prerequisite for converting the vanadium oxide into the coloring state is a redox reaction. In the crystallizable initial glass, the $V_2O_5$ still colors relatively weakly and produces a slightly greenish tint. During ceramization the redox reaction occurs, the vanadium is reduced and the redox partner is oxidized.

The refining agent functions as the primary redox partner, which was shown by Mossbauer investigations of Sb and Sn refined compositions. During ceramization, a part of the $Sb^{3+}$ or $Sn^{2+}$ in the initial glass is converted to the higher oxidation state $Sb^{5+}$ and $Sn^{4+}$, respectively. It was assumed that the vanadium is incorporated into the seed crystal in the reduced oxidation state as $V^{4+}$ or $V^{3+}$ and intensively colors therein due to electron charge transfer reactions. Also, as another redox partner, $TiO_2$ may reinforce the coloring by vanadium oxide. According to DE 10 2008 050 263 B4, besides the type and quantity of the redox partners in the initial glass, the redox state that is adjusted in the glass for the melt also has an influence. A low oxygen partial pressure, i.e. a melt adjusted as reducing, for example due to high melting temperatures, reinforces the coloring effect of the vanadium oxide.

But it is also possible that the reduced $V^{4+}$ or $V^{3+}$ is not or not exclusively incorporated into the seed crystals, but possibly also into another structural environment, such as the high-quartz mixed crystal, or into clusters.

With the invention, this coloration is locally modified by irradiation of high-energy radiation and heating of the glass ceramic.

This may be associated with an influence on the coloring charge transfer process. Since the hypothetical electron transfer between donor and acceptor centers in the charge transfer is significant for absorption, it can be assumed that the applied high-energy radiation and the heating cause a modification of the structure of these centers. This structural modification reduces the frequency/likelihood of electron transfers and thus absorption.

Because of the sensitivity with which the coloring by vanadium reacts to partial pressure of oxygen and to redox processes during ceramizing, competing valency changes might be relevant for this. That is to say, the radiation in combination with the heating may possibly remove electrons from the donor or acceptor centers thereby passivating them for the charge transfer process.

This hypothesis is supported by the observation that the reduced coloration can be reversed by thermal treatment. The thermodynamically more stable structural state of the centers can be restored. This re-increases the frequency of coloring charge transfers.

Figure 4:
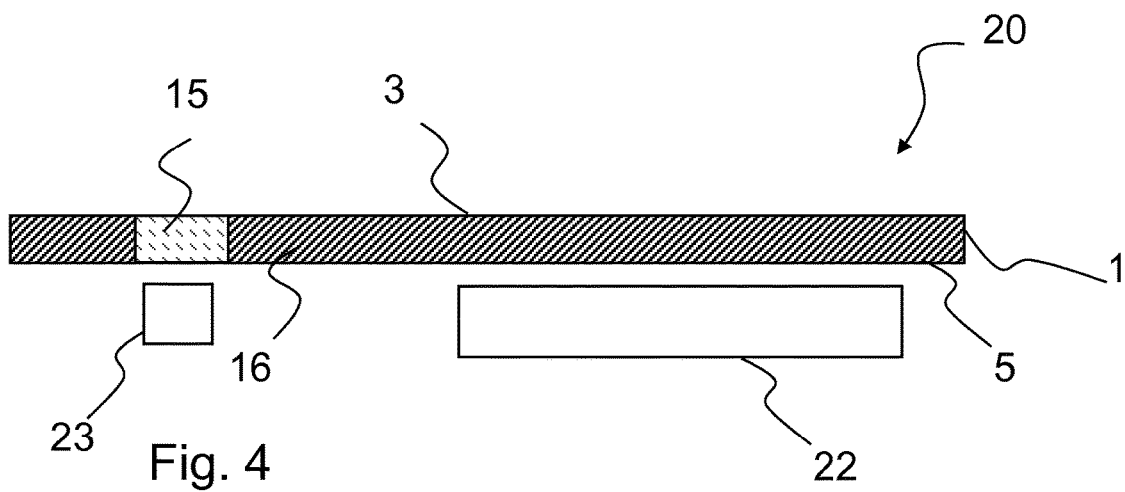
FIG. 4 shows a glass ceramic cooktop including a glass ceramic cooking plate according to the invention.

FIG. 4 shows a glass ceramic cooktop 20 as one of the preferred applications of the invention. Glass ceramic cooktop 20 comprises a glass ceramic cooking plate 1 in form of a glass ceramic plate that has a first face 3 which defines the upper surface in this example, and an opposite, second face which defines the lower surface. Underneath the lower surface or second face 5, a heating element 22 is arranged, for heating a cooking vessel place upon first face 3 above heating element 22. Glass ceramic cooking plate 1 has a first zone 15 which extends through the glass ceramic cooking plate 1 from one surface to the opposite surface of the two faces 3, 5, and in which light transmission is increased relative to adjacent zones 16. Underneath first zone 15, a preferably self-luminous display device 23 is disposed, whose light is visible through the first zone 15. First zone 15 was produced by a treatment according to the invention using a laser or another locally acting electromagnetic radiation source, heating and subsequent cooling. In order to avoid that the parts arranged under glass ceramic cooking plate 1, such as heating element 22, are visible when looking to upper surface 3, a volume-colored glass ceramic may be used, for instance with a vanadium oxide content of more than 0.02 percent by weight. Due to the local attenuation of absorption or local brightening of the glass ceramic in zone 15, the light from the display device will nevertheless be transmitted through the glass ceramic plate and will be clearly visible for an operator.

Since very clear brightening effects can be achieved with the invention, the method is especially useful for dark glass ceramic cooking plates to make them more transparent for display purposes. Therefore, without being limited to the exemplary embodiment, according to one embodiment of the invention a glass ceramic cooking plate is used, in which integral light transmission in the visible spectral range of the second zone 16 adjacent to first zone 15 is not more than 5%, preferably not more than 2.5%. In other words, the glass ceramic plate which is the starting material for the cooking plate exhibits such a low transmission of not more than 5%, preferably not more than 2.5%.

Figure 5:
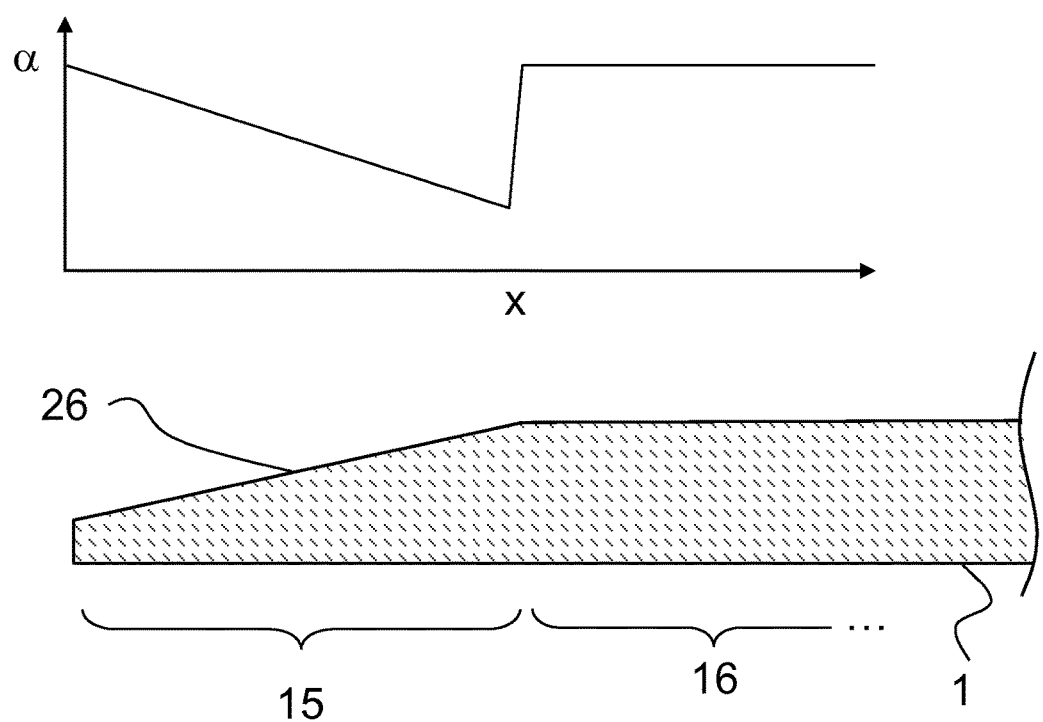
FIG. 5 shows a glass ceramic cooktop with a flat facet.

Display devices may also be arranged under a flat facet. An example of a glass ceramic plate 1 having such a flat facet 26 is shown FIG. 5. If now in an example as shown in FIG. 4 a display device is to be arranged below flat facet 26, a problem arising with volume-colored glass ceramics is that due to the varying thickness of the material in the region of flat facet 26 light transmission also varies along the surface. Here, the invention now generally provides the possibility to compensate for variations in transmission caused by varying thicknesses of the glass ceramic material. For this purpose, the treatment time and/or the power of incident electromagnetic radiation may be varied as a function of thickness. Above glass ceramic plate 1, FIG. 5 schematically shows a profile of absorption coefficient $\alpha$ as a function of displacement coordinate x along the surface of glass ceramic plate 1. Here, flat facet 26 extends from the edge of the glass ceramic plate where accordingly the glass ceramic plate 1 has the smallest thickness and therefore exhibits highest transmission without the treatment according to the invention. In order to keep transmission constant along flat facet 26, the absorption coefficient $\alpha$ is gradually lowered starting from the edge until the inside border of flat facet 26. Thus, the area provided with flat facet 26 also forms the first zone 15 in which coloring differs from a second, neighboring zone 16 adjacent flat facet 26 (i.e. the region with plane-parallel faces).

In this way, light transmission is maintained constant along flat facet 26, at the value it has at the edge of the plate. At the inside border of flat facet 26, the absorption coefficient may then rapidly increase to the value of the non-treated glass ceramic. Therefore, there is a step in the profile of the absorption coefficient at this point. Thus, flat facet 26 appears as a uniformly brightened area. Therefore, without being limited to the specific application shown in FIG. 5, a glass or glass ceramic element may be provided, which has a thickness that varies along at least a portion of the surface, in which the absorption coefficient is locally varied by the treatment of the invention, i.e. in first zone 15, as a function of the thickness, in particular in such a manner that light transmission which locally varies due to the varying thickness is evened out, at least partially. Specifically to this end, a decreasing absorption coefficient is adjusted with the thickness increasing.

In the exemplary embodiment of FIG. 4, the brightened first zone 15 is a localized window which typically only extends over a small portion of the surface area of face 3. A flat facet 26 as shown in the example of FIG. 5 typically does not extend over a large portion of face 3 either. According to one embodiment of the invention, therefore, the total surface area of the one or more first zones 15 at one face of the glass ceramic cooking plate occupies not more than one third of the surface area of this face 3.

Figure 6:
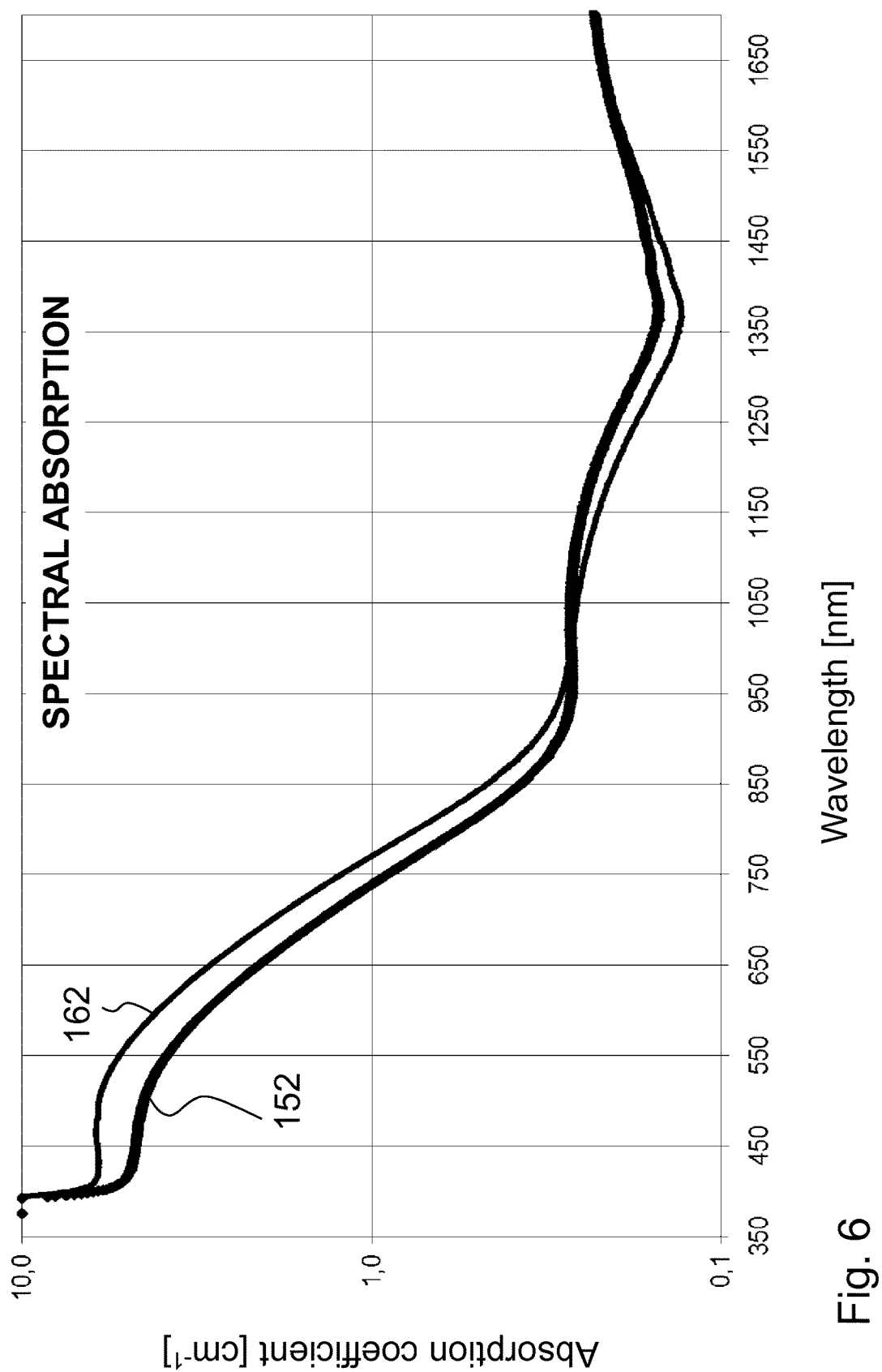
FIG. 6 is a graph of the absorption coefficient of a treated zone and a non-treated zone of a glass ceramic cooking plate as a function of wavelength.

FIG. 6 shows a diagram of the absorption coefficients as a function of wavelength as measured in a zone brightened according to the invention and in a non-treated zone. As with the curve of light transmittance shown in FIG. 3, the glass ceramic in which the profile was measured, is colored by vanadium oxide. The higher light transmission of a brightened zone 15 is now apparent here from the fact that the spectral absorption coefficient 152 of a brightened zone is lower in the visible spectral range than the absorption coefficient 162 of a neighboring, non-brightened zone 16. In particular, as in the example shown in FIG. 6, the absorption coefficient of the glass ceramic of a brightened zone 15 may be lower over the entire visible spectral range than the absorption coefficient of the material of an adjacent, non-brightened zone 16. In the visible spectral range, the absorption coefficient decreases with increasing wavelength. Accordingly, spectral light transmittance increases, similarly to the example shown in FIG. 3.

Also, it is obvious that the curves of spectral absorption coefficients 152, 162 cross each other in the infrared spectral range at a wavelength of about 1000 nanometers. From this wavelength on, the absorption coefficient of the first zone 15 is higher than the absorption coefficient of an adjacent, second zone 16.

In the example shown, the absorption coefficient of first zone 15 is higher than that of second zone 16 in the infrared range up to a wavelength of 1650 nanometers.

Generally, without being limited to the embodiment shown in FIG. 6, according to one embodiment of the invention it is therefore contemplated, that in at least a spectral range having a wavelength of more than 900 nanometers the absorption coefficient of first zone 15 is greater than the absorption coefficient of a second, adjacent zone 16, so that in the spectral range having a wavelength of more than 900 nanometers integral light transmission of first zone 15 is lower than integral light transmission of the second, adjacent zone 16 in this spectral range. Preferably, this spectral range extends at least between 1100 nanometers and 1400 nanometers, which also applies to the illustrated exemplary embodiment of FIG. 6.

The spectral range mentioned above in particular applies to glass ceramics colored by vanadium oxide. This effect of a higher absorption coefficient of first zone 15 in the infrared spectral range may also occur when coloration is effected by rare earths, in particular by cerium, preferably in combination with chromium and/or nickel and/or cobalt; by manganese, preferably in combination with tin and/or titanium; or by iron, preferably in combination with tin and/or titanium. However, the wavelength range may possibly differ from that of the example shown in FIG. 6.

An absorption coefficient of first zone 15 which is higher in the infrared spectral range may in particular be advantageous for a display device 23 arranged beneath zone 15 of a glass ceramic plate. In this manner the risk is reduced that the display device is heated excessively through the glass ceramic and becomes damaged, for example by heat sources on the cooktop.

It will be apparent to those skilled in the art that the invention is not limited to the described exemplary embodiments but can be varied in many ways without departing from the scope of the subject matter of the claims. For example, besides a laser other radiation sources are likewise conceivable. For instance a high-performance short-arc lamp may be used. To achieve a localized exposure to the light, the glass ceramic cooking plate may be masked appropriately. Also possible is the use of a microwave source with appropriate masking.

LIST OF REFERENCE NUMERALS

1 Glass ceramic cooking plate
3 First face of 1
5 Second face of 1
7 Silicon oxide ceramic support
9 Laser
11 Transfer fiber
13 Laser scanner
15 Localized zone of modified transmission
16 Zone of unchanged transmission
18 Cooling fluid
20 Glass ceramic cooktop
22 Heating element
23 Display device
26 Flat facet
90 Laser beam
150 X-ray diffraction spectrum of 15
160 X-ray diffraction spectrum of 16
151 Spectral transmittance of 15
161 Spectral transmittance of 16
152 Spectral absorption coefficient of 15
162 Spectral absorption coefficient of 16

What is claimed is:

1. A volume-colored monolithic glass ceramic cooking plate, comprising:
a first zone made of a common starting material as a second, adjacent zone, the first zone having a volume coloration of the volume-colored monolithic glass ceramic cooking plate that differs from a volume coloration of the second, adjacent zone due to the first zone being locally heated as compared to the second, adjacent zone so that an absorption coefficient of the first zone is lower than the absorption coefficient of the second, adjacent zone and so that integral light transmission in the visible spectral range is greater in the first zone than integral light transmission of the second, adjacent zone,
wherein light scattering in the first zone differs from light scattering in the second zone by not more than 20 percentage points, and
wherein the first zone is a window which is surrounded along at least three edges thereof or along at least 50% of its periphery by adjacent non-brightened second zones.

2. The glass ceramic cooking plate as in claim 1, wherein light scattering in the first zone differs from light scattering in the second zone by not more than 5 percentage points.

3. The glass ceramic cooking plate as in claim 1, further comprising ions of at least one metals selected from the group consisting of vanadium, tin, titanium, rare earth metals, cerium, chromium, nickel, cobalt, manganese, iron, and any combinations thereof.

4. The glass ceramic cooking plate as in claim 3, wherein the first zone is volume-colored by vanadium oxide, and wherein, in the first zone, integral light transmission in the visible spectral range is increased relative to the second, adjacent zone.

5. The glass ceramic cooking plate as in claim 4, wherein the first zone includes at least 0.005 percent by weight of vanadium oxide.

6. The glass ceramic cooking plate as in claim 1, wherein integral light transmission in the visible spectral range in the second zone is not more than 5%.

7. The glass ceramic cooking plate as in claim 1, wherein integral light transmission in the visible spectral range in the second zone is not more than 2.5%.

8. The glass ceramic cooking plate as in claim 1, wherein the first zone extends from a first surface to a second, opposite surface of the glass ceramic cooking plate.

9. The glass ceramic cooking plate as in claim 1, wherein the glass ceramic comprises an aluminosilicate glass ceramic, wherein the first zone has a content of keatite mixed crystal that is greater than in the second, adjacent zone.

10. The glass ceramic cooking plate as in claim 9, wherein the aluminosilicate glass ceramic comprises lithium aluminosilicate glass ceramic.

11. The glass ceramic cooking plate as in claim 1, wherein remission for visible light in the first zone differs from remission of the second zone by not more than 20 percentage points.

12. The glass ceramic cooking plate as in claim 1, comprising a spectral transmission in the first zone is within the entire spectral range between 420 nanometers and 780 nanometers and is greater than in the adjacent, second zone.

13. The glass ceramic cooking plate as in claim 1, wherein, in the first zone, integral transmission in the visible spectral range is greater by at least a factor of 2 relative to the second, adjacent zone.

14. The glass ceramic cooking plate as in claim 1, wherein, in the first zone, integral transmission in the visible spectral range is greater by at least 3% percentage points than integral transmission in the second zone.

15. The glass ceramic cooking plate as in claim 1, wherein the first zone has a surface area that is smaller than a surface area of the second zone.

16. The glass ceramic cooking plate as in claim 1, wherein the first zone has a stress at a surface that is lower than stress in a center of volume of the first zone.

17. The glass ceramic cooking plate as in claim 1, further comprising a thickness that varies along at least a portion of a surface and an absorption coefficient that locally varies as a function of the thickness.

18. The glass ceramic cooking plate as in claim 1, wherein the first zone has a total surface area at a face of the glass ceramic cooking plate that occupies not more than one third of the surface area of the face.

19. The glass ceramic cooking plate as in claim 1, wherein the absorption coefficient of the first zone is greater than the absorption coefficient of the second, adjacent zone in at least a spectral range of a wavelength of more than 900 nanometers so that integral light transmission of the first zone in the spectral range is smaller than integral light transmission of the second, adjacent zone.

20. A glass ceramic cooktop comprising a glass ceramic cooking plate according to claim 1, wherein the first zone extends through the glass ceramic cooking plate from one face to an opposite face and in which integral light transmission is increased relative to the adjacent zone, and further comprising a display device disposed under the first zone so that light from the display device is visible through the first zone.

21. The glass ceramic cooktop as in claim 20, wherein the first zone has a total surface area at one face of the glass ceramic cooking plate that occupies not more than one third of the surface area of that face.

22. The glass ceramic cooking plate as in claim 1, wherein the first zone has a transmission at least in a spectral range within the visible spectrum between 380 nanometers and 780 nanometers of light wavelength.

* * * * *